US009805439B2

United States Patent
Diard

(10) Patent No.: US 9,805,439 B2
(45) Date of Patent: Oct. 31, 2017

(54) MEMORY SPACE MAPPING TECHNIQUES FOR SERVER BASED GRAPHICS PROCESSING

(71) Applicant: Nvidia Corporation, Santa Clara, CA (US)

(72) Inventor: Franck Diard, Saint Contest (FR)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 15/001,600

(22) Filed: Jan. 20, 2016

(65) Prior Publication Data

US 2016/0132346 A1    May 12, 2016

Related U.S. Application Data

(63) Continuation-in-part of application No. 13/462,801, filed on May 2, 2012, now Pat. No. 9,311,169, and a
(Continued)

(51) Int. Cl.
*G06T 1/20* (2006.01)
*G06F 9/455* (2006.01)
(Continued)

(52) U.S. Cl.
CPC ............ *G06T 1/20* (2013.01); *G06F 9/45533* (2013.01); *G06F 9/45545* (2013.01);
(Continued)

(58) Field of Classification Search
None
See application file for complete search history.

(56) References Cited

U.S. PATENT DOCUMENTS 4,733,222 A    3/1988   Evans
5,455,958 A    10/1995  Flurry et al.
(Continued)

FOREIGN PATENT DOCUMENTS

TW    201115501    5/2011
TW    201207735    2/2012
(Continued)

OTHER PUBLICATIONS

Anthony Leather; "Intel Xeon E5-2670 Review", Published on Mar. 6, 2012.
(Continued)

*Primary Examiner* — Maurice L McDowell, Jr.
*Assistant Examiner* — Donna J Ricks

(57) ABSTRACT

The server based graphics processing techniques, describer herein, include loading a given instance of a guest shim layer and loading a given instance of a guest display device interface that calls back into the given instance of the guest shim layer, in response to loading the given instance of the guest shim layer, wherein the guest shim layer and the guest display device interface are executing under control of a virtual machine guest operating system. The given instance of the shim layer requests a communication channel between the given instance of the guest shim layer and a host-guest communication manager (D3D HGCM) service module from a host-guest communication manager (HGCM). In response to the request for the communication channel loading, the D3D HGCM service module is loaded and a communication channel between the given instance of the shim layer and the D3D HGCM service module is created by the HGCM. The given instance of the shim layer maps the graphics buffer memory space of a host D3D DDI binary executing under control of a host operating system. Thereafter, function calls are sent from the given instance of the
(Continued)

guest shim layer through the communication channel to the D3D HGCM service module utilizing the graphics buffer memory space mapping.

14 Claims, 8 Drawing Sheets

Related U.S. Application Data continuation-in-part of application No. 14/066,673, filed on Oct. 29, 2013, now Pat. No. 9,613,390, and a continuation-in-part of application No. 14/066,683, filed on Oct. 29, 2013, now Pat. No. 9,542,715.

(51) Int. Cl.
*G06F 12/08* (2016.01)
*G06F 9/54* (2006.01)
*G06F 12/0875* (2016.01)

(52) U.S. Cl.
CPC ......... *G06F 9/545* (2013.01); *G06F 12/0875* (2013.01); *G06F 2212/455* (2013.01); *G06F 2212/50* (2013.01); *G06F 2212/608* (2013.01)

(56) References Cited

U.S. PATENT DOCUMENTS

| | | | |
|---|---|---|---|
| 6,886,168 | B2 | 4/2005 | Callaway et al. |
| 7,519,976 | B2 | 4/2009 | Blevins |
| 8,510,754 | B1 | 8/2013 | Lozben et al. |
| 9,311,169 | B2 | 4/2016 | Diard |
| 2002/0170067 | A1 | 11/2002 | Norstrom et al. |
| 2005/0088445 | A1 | 4/2005 | Gonzalez et al. |
| 2007/0008324 | A1 | 1/2007 | Green |
| 2007/0067535 | A1 | 3/2007 | Liu |
| 2007/0195099 | A1 | 8/2007 | Diard et al. |
| 2008/0163265 | A1 | 7/2008 | Flora |
| 2008/0168479 | A1 | 7/2008 | Purtell et al. |
| 2008/0235710 | A1 | 9/2008 | Challenger et al. |
| 2008/0244682 | A1 | 10/2008 | Sparrell et al. |
| 2009/0113425 | A1* | 4/2009 | Ports .................. G06F 9/4426 718/1 |
| 2010/0037235 | A1 | 2/2010 | Larimore et al. |
| 2010/0115174 | A1 | 5/2010 | Akyol et al. |
| 2010/0125529 | A1 | 5/2010 | Srinivasan et al. |
| 2011/0067038 | A1 | 3/2011 | Troccoli et al. |
| 2011/0102443 | A1 | 5/2011 | Dror et al. |
| 2011/0210976 | A1* | 9/2011 | Diard .................. G06F 9/455 345/522 |
| 2011/0289481 | A1* | 11/2011 | Franklin ............ G06F 11/3668 717/125 |
| 2011/0292057 | A1 | 12/2011 | Schmit et al. |
| 2011/0321049 | A1 | 12/2011 | Hickey et al. |
| 2012/0154389 | A1* | 6/2012 | Bohan ................. G06F 9/5072 345/419 |
| 2012/0222051 | A1 | 8/2012 | Kakulamarri et al. |
| 2012/0324358 | A1 | 12/2012 | Jooste |
| 2013/0181999 | A1 | 7/2013 | Malakapalli et al. |
| 2013/0265271 | A1 | 10/2013 | Hsu et al. |
| 2013/0271161 | A1 | 10/2013 | Solven et al. |
| 2013/0275973 | A1 | 10/2013 | Greenfield et al. |
| 2014/0009576 | A1 | 1/2014 | Hadzic et al. |
| 2014/0063028 | A1 | 3/2014 | Diard |
| 2015/0009222 | A1 | 1/2015 | Diard et al. |
| 2015/0113527 | A1 | 4/2015 | Diard et al. |
| 2015/0194136 | A1 | 7/2015 | Diard et al. |

FOREIGN PATENT DOCUMENTS

| | | |
|---|---|---|
| TW | 201214287 | 4/2012 |
| TW | 201216199 | 4/2012 |
| WO | 0154061 | 7/2001 |

OTHER PUBLICATIONS

Ryan Schrout; Galaxy GeForce GT 640 GC 1GB DDR3 Review-GK107 is no GK104. Jun. 20, 2012.

\* cited by examiner

MEMORY SPACE MAPPING TECHNIQUES FOR SERVER BASED GRAPHICS PROCESSING

CROSS-REFERENCE TO RELATED APPLICATIONS

This is a continuation-in-part of U.S. patent application Ser. No. 13/462,801 filed May 2, 2012, U.S. patent application Ser. No. 14/066,673 filed Oct. 29, 2013, and U.S. patent application Ser. No. 14/066,683 filed Oct. 29, 2013, all of which are incorporated herein by reference.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data, increased consumption of electronic content, and the like in most areas of entertainment, education, business, and science. Developing aspects of computing systems include client-server computing platforms, virtual machine computing platforms, and cloud computing platforms, and graphics processing thereon.

For graphics intensive applications, such as multiplayer online computer games, the Windows® operating system runs each instance of the application in full screen mode. The full screen mode is an exclusive mode such that another instance of the running application cannot output display frames because the first instance is running full screen. Therefore, even on a server with multiple graphics processing units, multiple instances of an application cannot be run at the same time because the first application will be running in full screen mode. Similarly, even on virtual machine implementations, the first application running on a guest operating system will run full screen and prevent other applications running on other guest devices from outputting display frames. However, with the proliferation of multi processor and/or multi core CPU and/or GPU server devices it would be beneficial to be able to run multiple graphics intensive applications or instances of the same application. Accordingly, there is a continued need for improved graphics processing techniques on client-server computing platforms, virtual machine computing platforms, and cloud computing platforms.

SUMMARY OF THE INVENTION

The present technology may best be understood by referring to the following description and accompanying drawings that are used to illustrate embodiments of the present technology directed toward server based graphics processing techniques.

In one embodiment, a server based graphics processing method includes loading a given instance of a guest shim layer and loading a given instance of a guest display device interface that calls back into the given instance of the guest shim layer, in response to loading the given instance of the guest shim layer. The guest shim layer and the guest display device interface are executing under control of a virtual machine guest operating system. The given instance of the shim layer requests a communication channel between the given instance of the guest shim layer and a three dimensional graphics application programming interface host-guest communication manager (D3D HGCM) service module from a host-guest communication manager (HGCM), in response to the loading of the given instance of the guest shim layer. The D3D HGCM service module is loaded and a communication channel between the given instance of the shim layer and the D3D HGCM service module is created by the HGCM, in response to the request for the communication channel. The given instance of the shim layer requests a copy of the binary of the host D3D DDI that is stored on the host device. The given instance of the shim layer receives the host D3D DDI binary and store the host D3D binary on the disk of the virtual machine. Thereafter, the given instance of the shim layer loads and uses the entry point of the imported host D3D DDI binary to generate command buffers to pass down to the host through the HGCM.

Embodiments of the present technology advantageously map graphic buffers allocated by a thunk layer in a kernel mode driver stack so that a guest DDI in a guest VM OS can access the memory space in the host OS directly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer similar elements and in which.

DETAILED DESCRIPTION OF THE INVENTION

Figure 1:
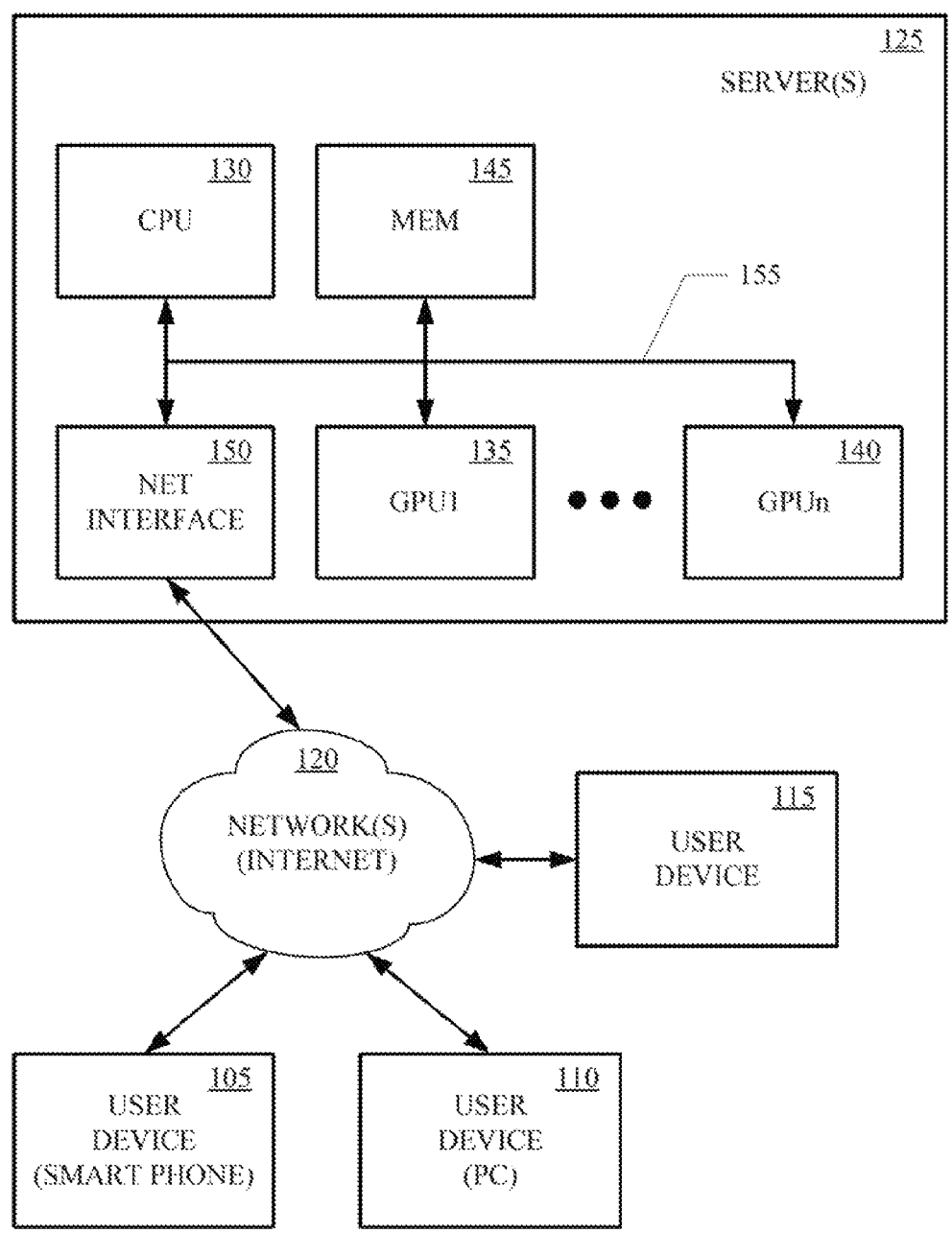
FIG. 1 shows a block diagram of a hardware level representation of a client-server or cloud computing platform, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, a hardware level representation of a client-server or cloud computing platform, in accordance with one embodiment of the present technology, is shown. The client-server or cloud computing platform 100 includes a plurality of user devices 105-115 communicatively coupled by one or more networks 120 to one or more server devices 125. In the cloud computing platform, hardware resources, software, and information are provided to user devices as a utility over a network. Therefore, the cloud computing platform delivers computing as a service rather than a product. User devices access cloud based resources through a web browser or a light weight desktop or mobile application. The cloud computing platform enables device and location independence, virtualization, multi-tenancy, reliability, performance, security, maintenance, infrastructure convergence, shared services and/or the like to service demands that may be fluctuating, unpredictable and/or the like.

Each server 125 may include one or more processing units 130-140, one or more computing device readable media (e.g., memory) 145, one or more network interfaces 150, and/or the like, communicatively coupled together by one or more communication links 155. In one implementation, the server includes a central processing unit (CPU) 130, non-volatile memory such as read-only memory (ROM), magnetic hard disk drive, optical disk drive and/or the like, volatile memory such as random access memory, one or more network interface cards for communicatively coupling the server 125 to one or more networks 120, and a plurality of graphics processing units 135-140.

Applications running on the server device 125 may render display frames to be output on a display of the user device 105. The display frame data is encoded at the server 125 to compress it, and transmitted across one or more networks 120 to the user device 105. The user device 105 decodes the display frame data and outputs it on the display attached to the user device 105. In one implementation, the application may be a graphics intensive application such as a multi-player computer game or the like.

Figure 2:
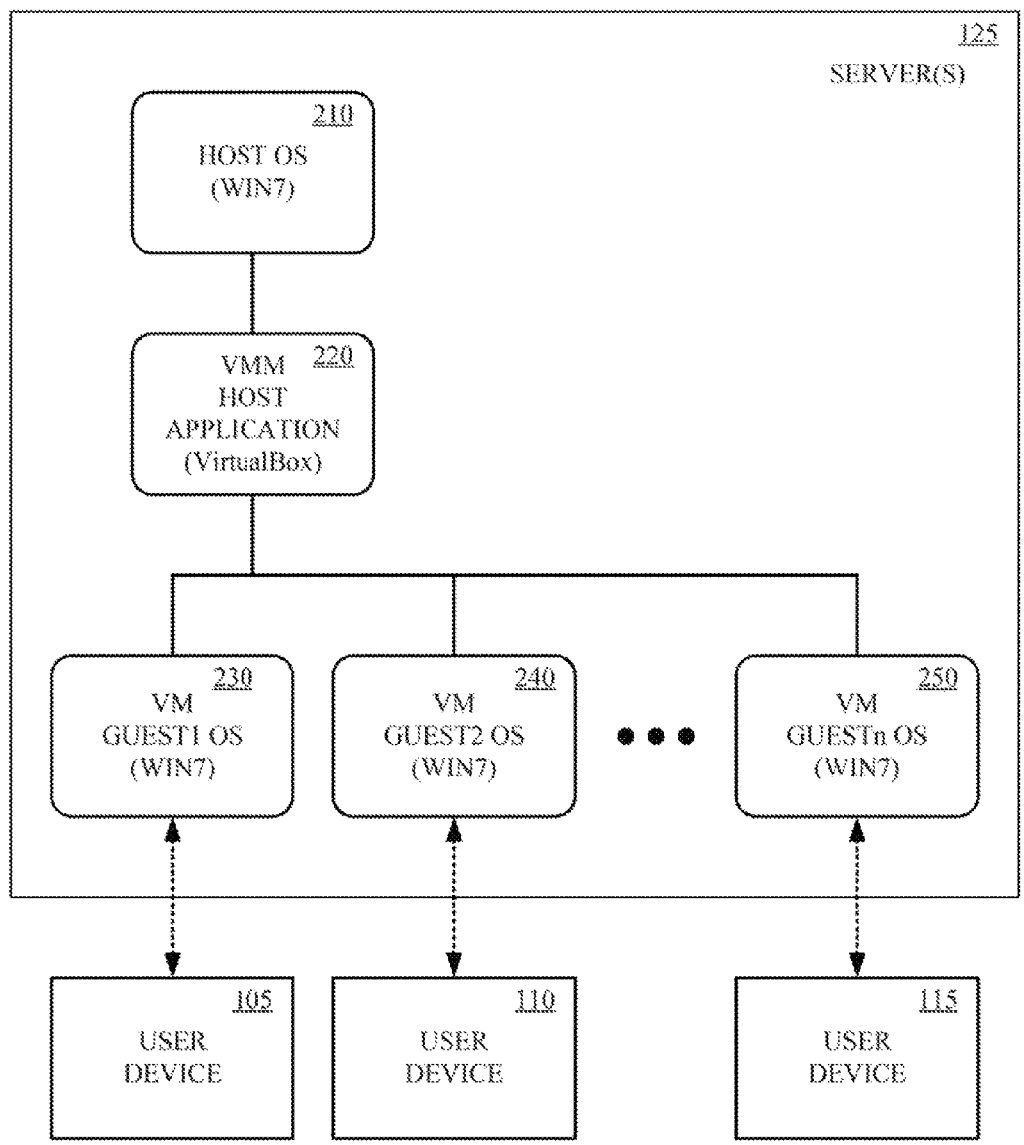
FIG. 2 shows a block diagram of a virtual machine representation of the client-server or cloud computing platform, in accordance with one embodiment of the present technology.

Referring now to FIG. 2, a virtual machine representation of the client-server or cloud computing platform, is shown. The one or more processors of the server 125 executing computing device executable instructions implement a host operating system 210, a virtual machine management (VMM) host application 220, and a plurality of virtual machine (VM) guest operating systems 230-250. In one implementation, the host operating system 210 may be Windows 7® Operating System, by Microsoft of Redmond, Wash., USA. The VMM host application 220 is run as an application of the host operating system 210. In one implementation, the virtual machine management host application 220 may be VirtualBox®, by Oracle of Redwood Shores, Calif., USA. A plurality of VM guest operating systems 230-250 run in the virtual machine implemented by the VMM host application 220. In one implementation, each VM guest operating system 220-250 may be an instance of the Windows 7 Operating System. Each of one or more user devices 105-115 may communicatively couple to the server 125 as a guest through a corresponding instance of the VM guest operating system 220-250

Figure 3:
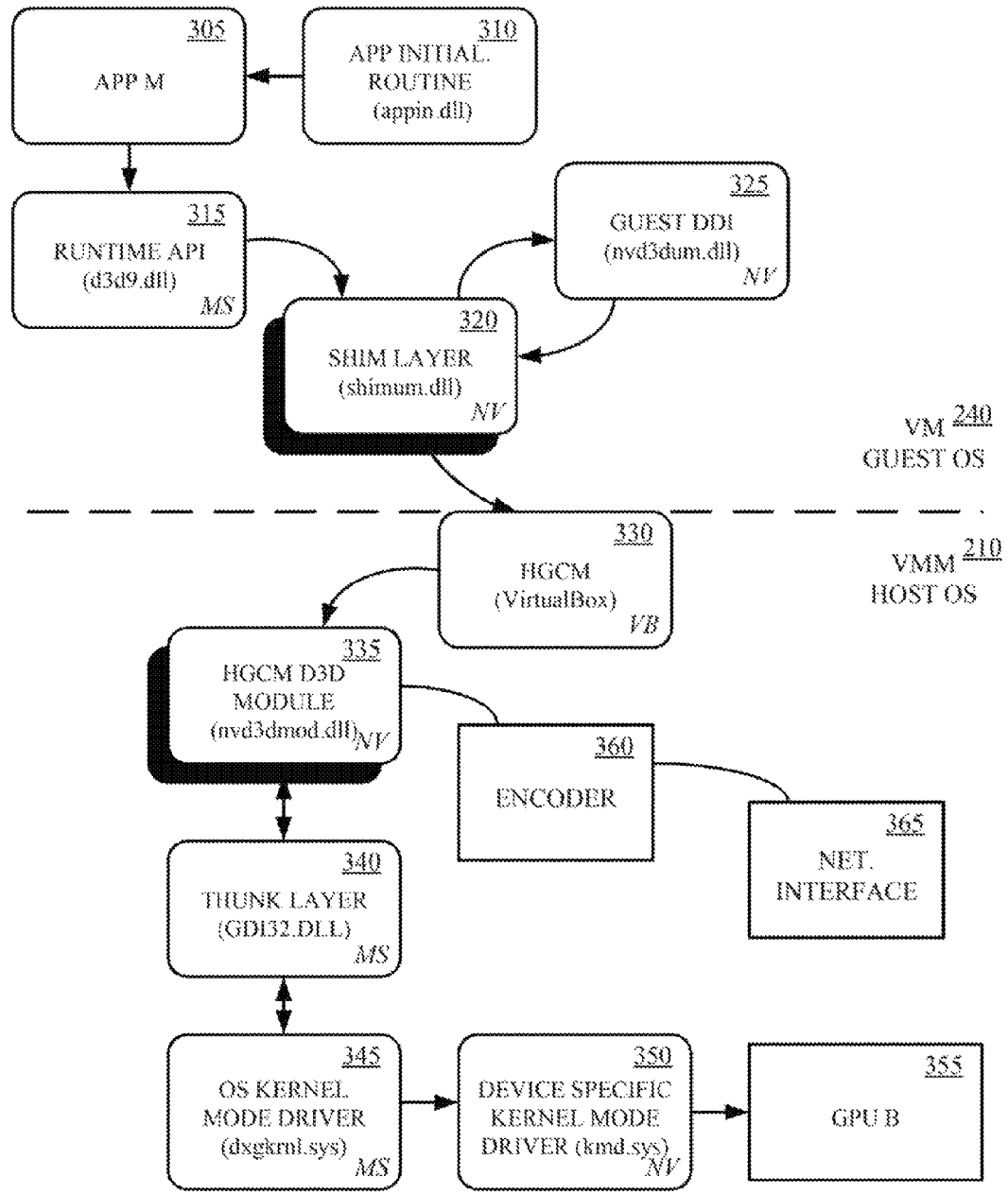
FIG. 3 shows a block diagram of a virtual machine representation at the rendering function level of the client-server or cloud computing platform, in accordance with one embodiment of the present technology.
Figure 4A:
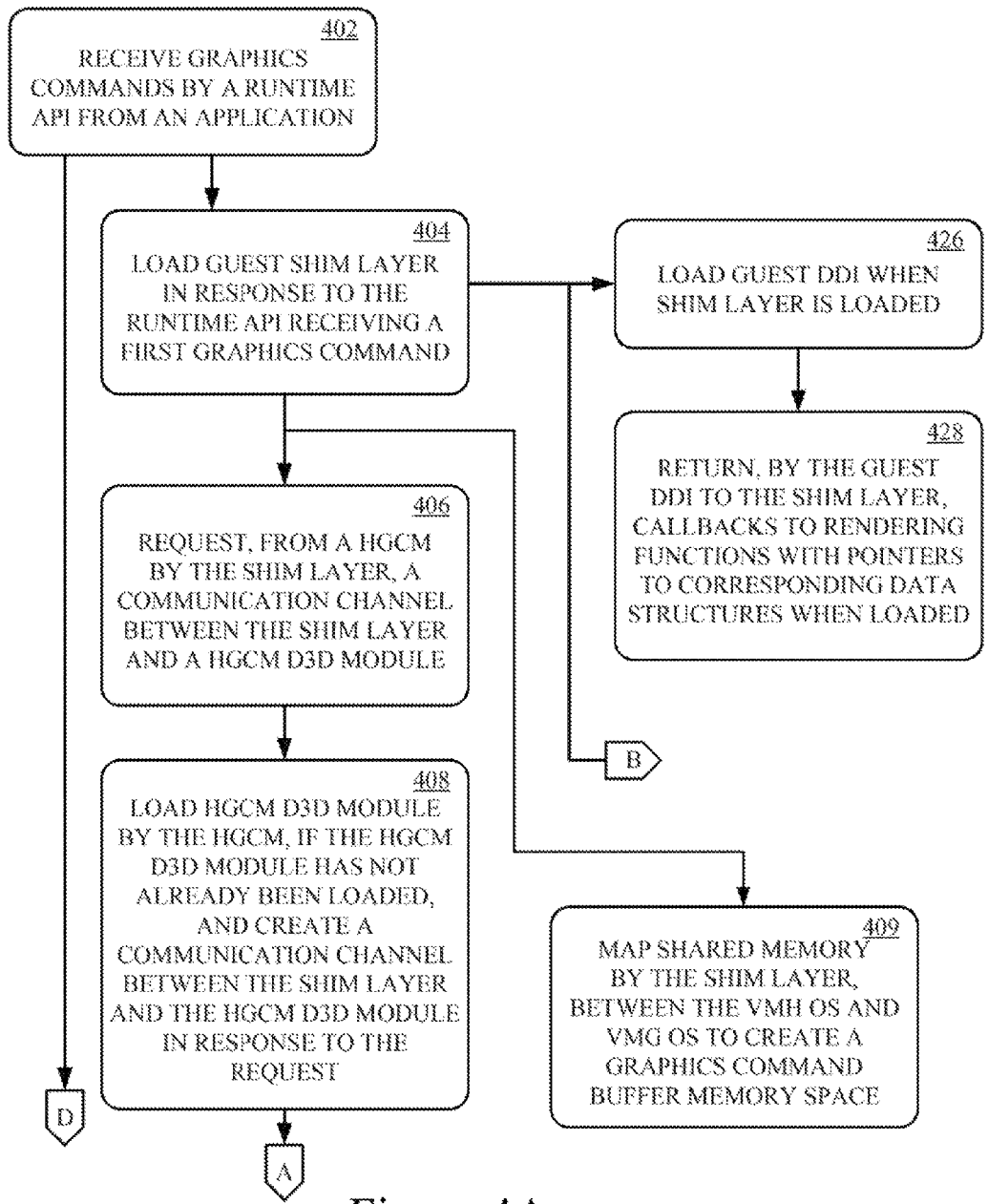
FIGS. 4A-4E show a flow diagram of a client-server or cloud computing based graphics processing method, in accordance with one embodiment of the present technology.
Figure 4B:
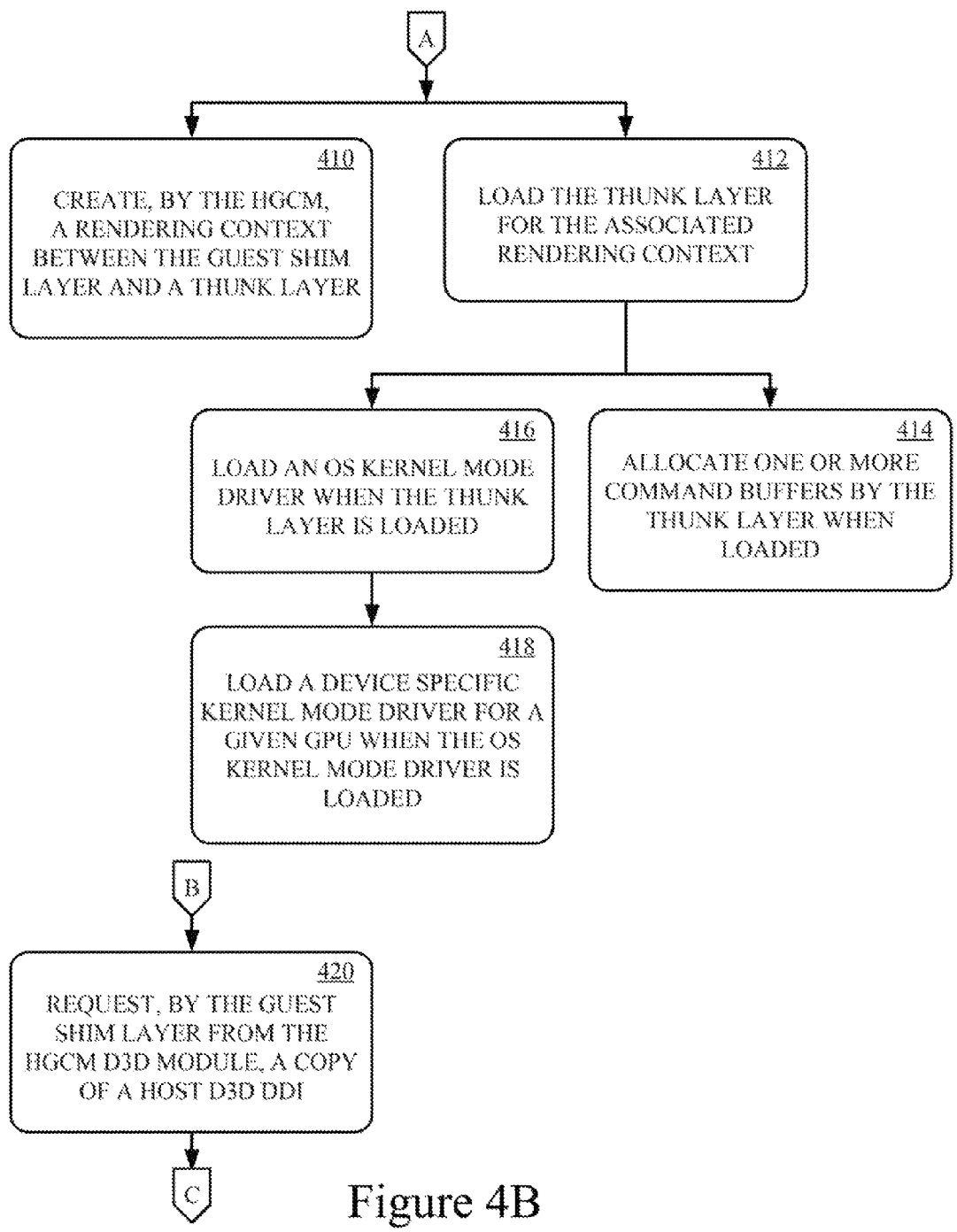
Figure 4C:
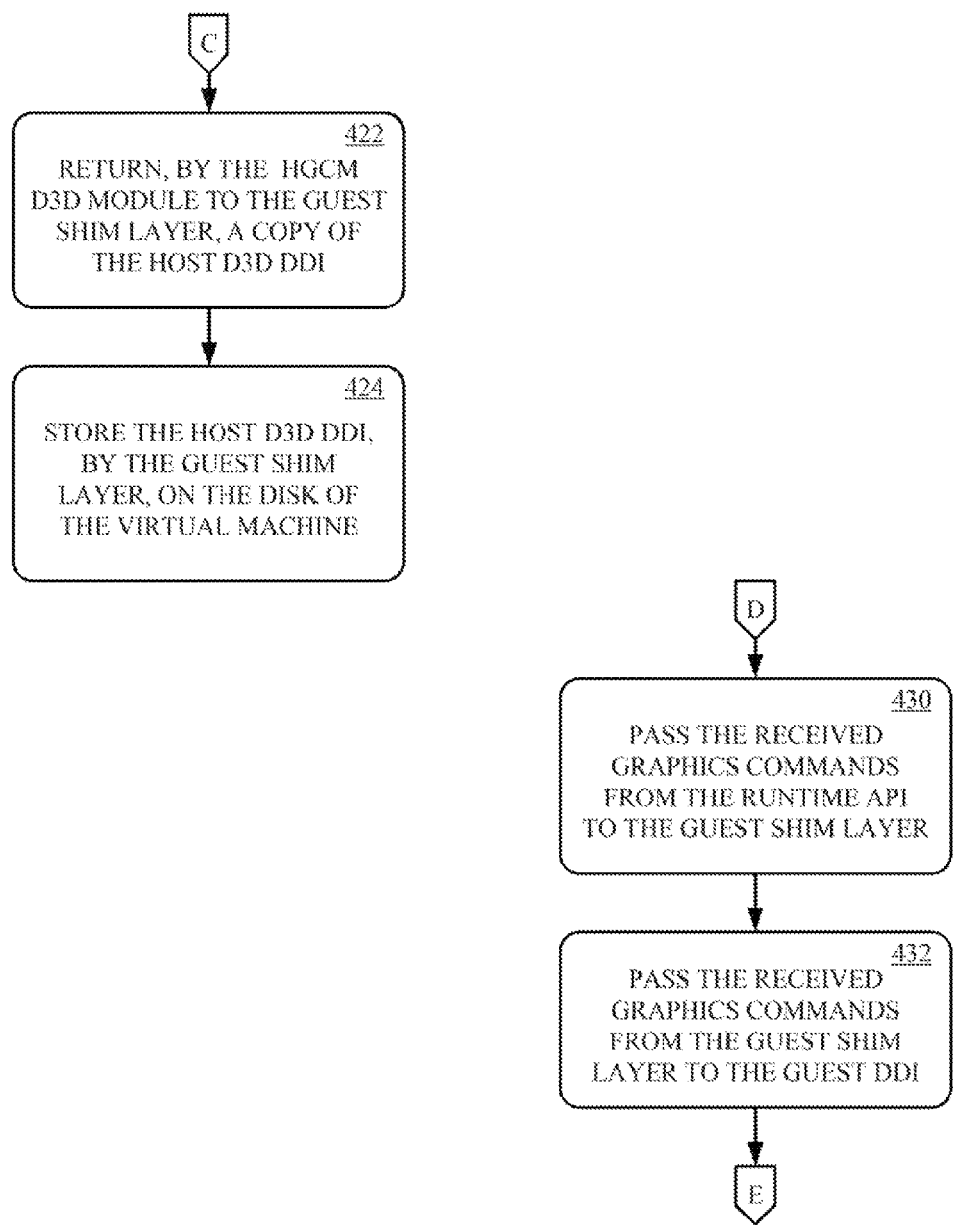
Figure 4D:
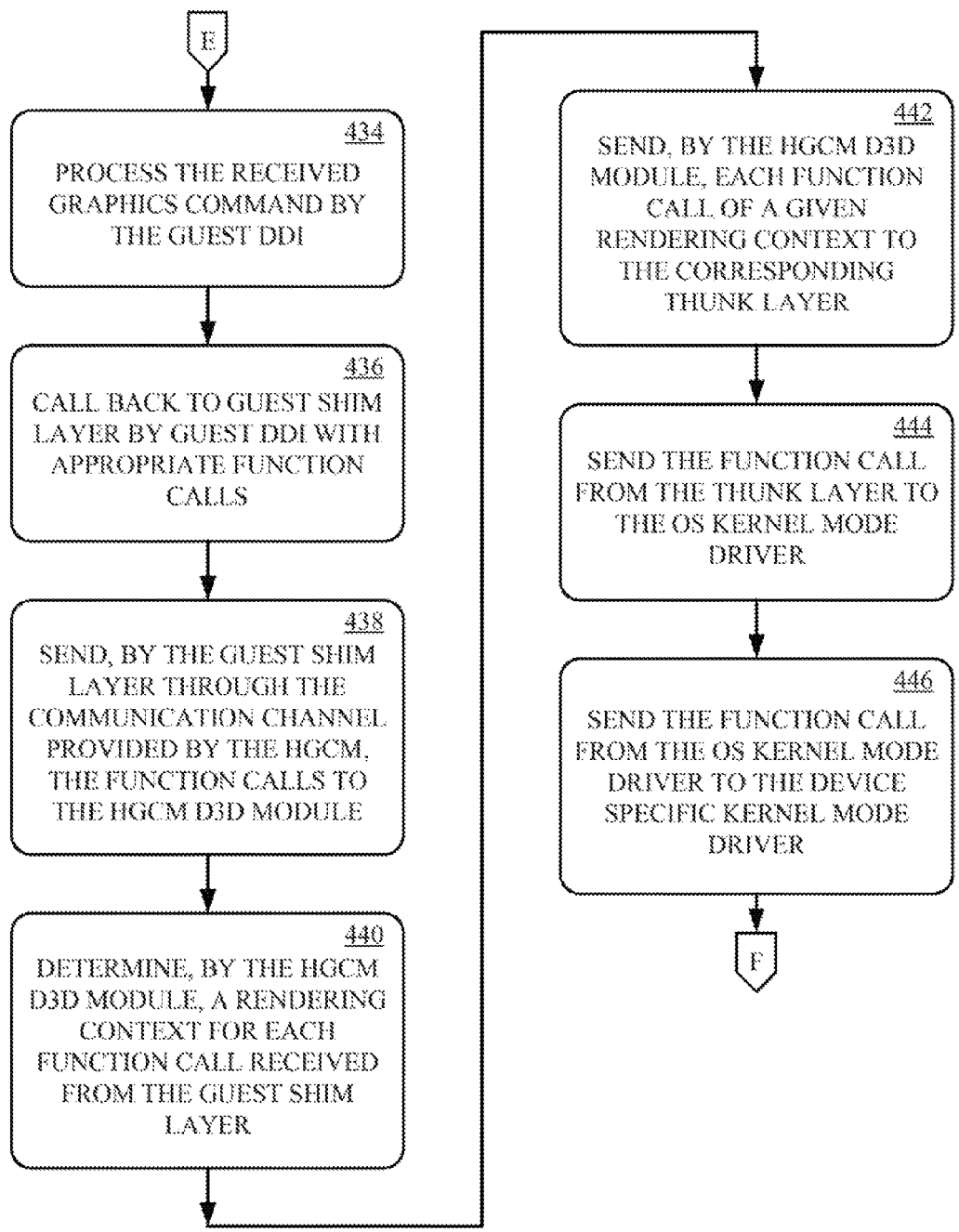
Figure 4E:
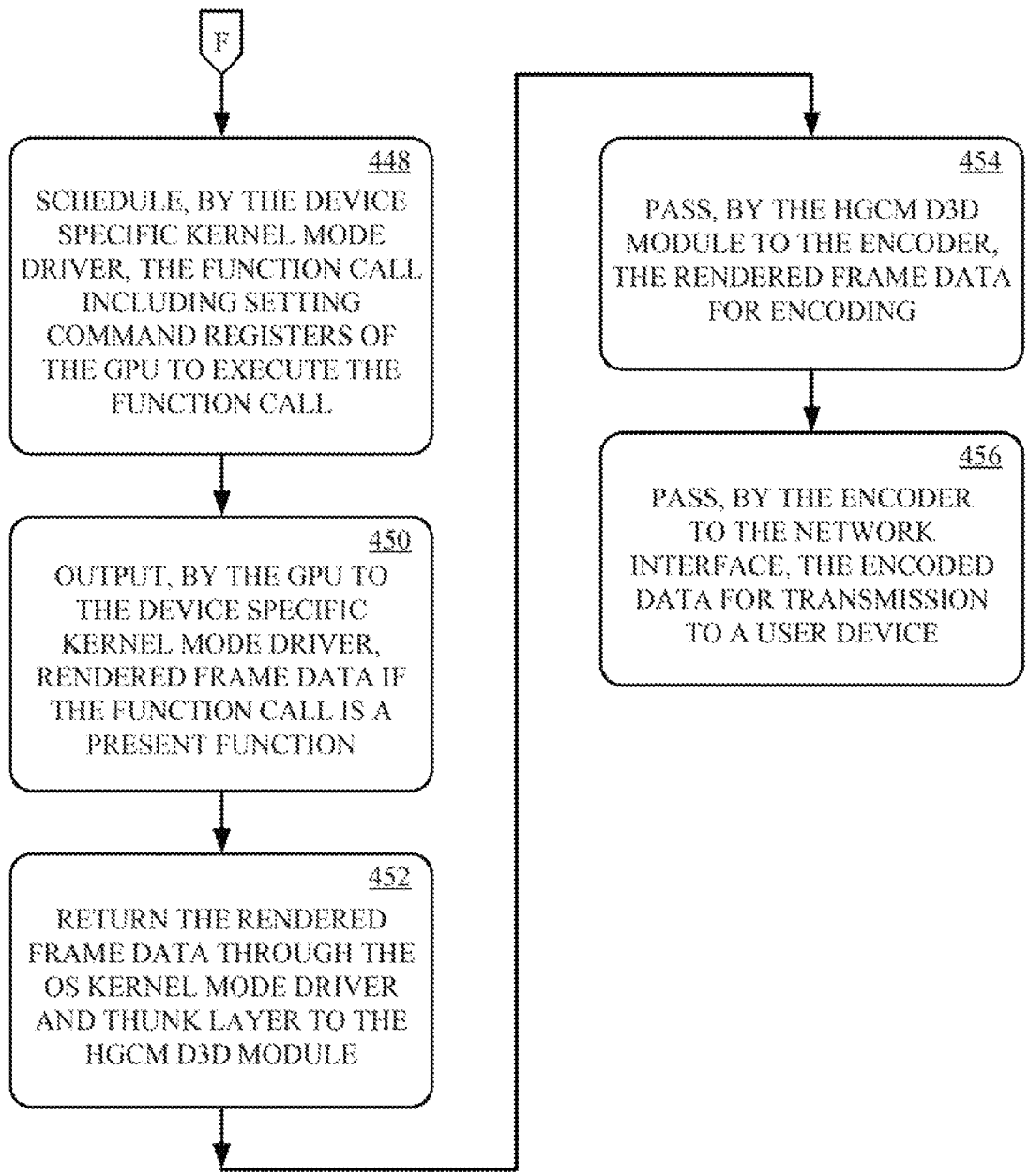

Referring now to FIG. 3, a virtual machine representation at the rendering function level of the client-server or cloud computing platform, in accordance with one embodiment of the present technology, is shown. The server device includes applications, drivers, utilities and the like for each of a plurality of guests executing under control of a respective virtual guest operating system 240. The server device also includes a virtual machine monitor host application, and drivers, utilities and the like for each of one or more hosts, executing under control of a VMM host operating system 210. In one implementation, the VM guest OS 240 controls the execution of a user application 305, an application initialization utility 310, a runtime application programming interface (API) 315, a guest shim layer 320 and a guest device driver interface (DDI) 325. The VMM host OS 210 controls the execution of a host-guest communication manager (HGCM) 330, a three dimension graphics application programming interface host-guest communication manager (D3D HGCM) service module 335, a thunk layer 340, an OS kernel mode driver 345, and a device specific kernel mode driver 350.

For each rendering context, in one implementation, the guest may include an instance of the user application 305, the application initialization utility 310, the runtime application programming interface 315, the guest shim layer 320, the guest DDI 325, the thunk layer 340, the OS kernel mode driver 345, the device specific kernel mode driver 350, and the given GPU 355. The HGCM 330 and D3D HGCM service module 335 are shared across a plurality of guests.

Although FIG. 3 illustrates a single guest, it is appreciated that a plurality of guests are typically implemented on a server device.

When an application 305 starts running on the VM guest OS 240, the application initialization routine 310 is injected. In one implementation, the application initialization routine 310 is a short dynamic link library (e.g., appin.dll). The application initialization routine 310 injected in the application 305 includes some entry points, one of which includes a call (e.g., set_dll_searchpath( )) to change the search path for the display device interface. During initialization, the search path for the display device interface (e.g., c:\ . . . \windows\system32\ . . . \umd.dll) is changed to the search path of the guest shim layer (e.g., c:\ . . . \vmm\ . . . \umd.dll) 320. Therefore the runtime API 315 will search for the DDT in a different path, which will result in the runtime API 315 loading the guest shim layer 320. In one implementation, the guest shim layer 320 is an independent library. The guest shim layer library 320 has the same entry points as a conventional display device interface (DDI).

During initialization, the guest shim layer 320 loads the guest DDI 325. In one implementation, the guest DDI 325 may be a user mode driver dynamic linked library (nvd3dUMD.dll). The runtime API 315 passes one or more pointers to the guest shim layer 320 when calling into the applicable entry point (e.g., OpenAdapter( )) in the guest shim layer 320. The pointers passed to the guest shim layer 320 are call backs into the runtime API 315. The guest shim layer 320 stores the pointers received from the runtime API 315. The guest shim layer 320 loads and initializes the guest DDI 325 by passing pointers which are call backs into local functions of the guest shim layer 320. The guest DIN 325 also returns pointers to one or more data structures to the guest shim layer 320. The pointers returned from the guest DDI 325 to the guest shim layer 320 may include pointers to one or more command buffers. The data structure pointers returned by the guest DDI 325 are stored by the guest shim layer 320. Accordingly, the guest DIN 325 is able to initialize without talking back to the runtime API 315.

During initialization, each guest shim layer 320 also requests a communication channel (e.g., pipe, socket) from the HGCM 330. When a communication channel is established a mapping is created to associate a rendering context of a given guest to a given GPU hardware of the host. In one implementation the HGCM returns a token identifier (ID) to the guest shim layer 320 that identifies the rendering context mapping. The guest shim layer 320 also requests that the HGCM 330 load the D3D HGCM service module 335. The guest shim layer 320 further requests a copy of the binary file of the thunk layer 340, OS kernel mode driver 345 and/or device specific user mode driver 350. In response the HGCM 330 retrieves the binary of the thunk layer 340, OS kernel mode driver 345 and/or device specific user mode driver 350 and returns it across the communication channel to the guest shim layer 320. The guest shim layer stores 320 the binary of the thunk layer 340, OS kernel mode driver 345 and/or device specific user mode driver 350 (hereinafter referred to as the host stack binary) in memory (e.g., virtual disk) for use in determining the format of applicable data structures so that the commands sent by the guest shim layer 320 match the format utilized in the host stack. The data structure details referenced in the host stack binary may include the particular buffers utilized, the locations thereof, and the like. The D3D HGCM service module 335, thunk layer 340, OS kernel mode driver 345 and/or device specific kernel mode driver 350 also create a memory allocation to storing the data structures used for passing rendering commands down through stack from the guest application to the device specific kernel mode driver.

Thereafter, during rendering, the application 305 sends various commands to the runtime API 315. The commands may include such things as draw a triangle, change a color, set a texture, and/or the like. In one implementation, the commands from the application 305 may be DirectX commands. The runtime API 315 may validate the commands before calling into the guest shim layer 320 with the commands. The runtime API 315 may operate substantially in accordance with a conventional runtime API from Microsoft Corporation (e.g., d3d9.dll). The guest shim layer 320 in turn calls into the guest DDI 325 with the commands. The guest DIM 325 transforms the command functions calls into byte code calls in command buffers allocated in accordance with the stored copy of the host stack binary. When the command buffers have been set, one or more function calls including pointers to the command buffers are forwarded from the guest DDT 325 to the guest shim layer 320 by callbacks specified in the initialization phase. The function calls, including pointers to the command buffers, are forwarded by the guest shim layer 320 through the HGCM 330 to the D3D HGCM service module 335. The remote procedure calls are routed across a pipe between the guest and the host, setup when the HGCM was initialized. In one implementation, the guest shim layer 320 passes a token ID associated with the rendering context to the D3D HGCM service module 335 along with the calls from the guest DDI 325.

The D3D HGCM service module 335 determines a rendering context for the function call received from the guest shim layer 320. In one implementation, the D3D HGCM service module 335 utilizes the token ID as a handle to a data structure that defines the rendering context of the corresponding guest. The D3D HGCM service module 335 in turn forwards the function calls through the thunk layer 340, to the operating system kernel mode driver 345. The operating system kernel mode driver 345 in response schedules the command buffers at the function pointers included with the function calls with the device specific kernel mode driver 350 for execution of the functional calls by a given GPU 355. The device specific kernel mode driver 355 sets command register of the GPU 355 to execute the graphics command, and controls the execution thereof by the GPU 355. In one implementation, the thunk layer 340 may operate substantially the same as a conventional thunk layer from Microsoft Corporation (e.g., GDI32.dll). The OS kernel mode driver 345 may operate substantially the same as a conventional OS kernel mode driver from Microsoft Corporation (e.g., dxgkrnl.sys) In one implementation, the device specific kernel mode driver may operate substantially the same as a conventional device specific kernel mode driver from Nvidia Corporation, of Santa Clara, Calif. (e.g., kmd.sys).

For a display related function call (e.g., Present( )), the D3D HGCM service module 335 routes the rendered frame data to an encoder, associated API and driver 360 (hereinafter simply referred to as the encoder) when the rendered frame data is returned to the D3D HGCM service module 335. The rendered frame data is rerouted by the D3D HGCM service module 335 to the encoder 360 instead of back to the guest shim layer, guest DDI, runtime API and application. The encoder 360 encodes the rendered frame data to compress the data. The compressed data is then sent from the encoder 360 to a network interface, associated API and driver 365 (hereinafter simply referred to as the network interface) for transmission to the appropriate user device

105-115. In one implementation, the encoder 360 may be a conventional encoder such as a H.264 encoder.

At the thunk layer 340, OS kernel mode driver 345 and device specific kernel mode driver 350 levels, the function calls are merely rendering tasks and there is not a sense of full screen mode. The D3D HGCM service module 335 can be the target of several host-guest communication manager sessions, which means that several guest VM can talk to the same components in the host. The way components in the host are scheduled, they do not need to go full screen. However, the application 305 running in the VM guest OS 240 is running full screen but does not show anything on its virtual screen. In fact, the VM guest OS 240 need not receive the rendered image back from the VMM host OS 210.

Referring now to FIGS. 4A-4E, a client-server or cloud computing based graphics processing method, in accordance with one embodiment of the present technology, is shown. The method may be implemented as one or more sets of computing device-executable instructions (e.g., computer programs, utilities, drivers, routines) that are stored in one or more computing device-readable media (e.g., computer memory) and executed by one or more processing units (e.g., CPUs, GPUs).

The method begins with receiving graphics commands by a runtime application programming interface (API) from an application running under control of a virtual machine (VM) guest operating system (OS), at 402. At 404, a guest shim layer is loaded in response to the runtime API receiving a first graphics command. At 406, the guest shim layer requests from a host-guest communication manager (HGCM) a communication channel (e.g., pipe, socket) to a three dimension graphics application programming interface a host-guest communication manager (D3D HGCM) service module when the guest shim layer is loaded. The HGCM is loaded under control of a virtual machine management (VMM) host OS. At 408, the HGCM loads the D3D HGCM service module if it has not already been loaded, and creates a communication channel (e.g., pipe, socket) between the guest shim layer and the D3D HGCM service module in response to the request from the guest shim layer. At 409, the shim layer maps shared memory between a given virtual machine host operating system and the virtual machine guest operating system to create a graphics command buffer memory space for each of one or more rendering contexts. At 410, the HGCM associates a rendering context (e.g., adapter) between the given instances of the guest shim layer and a thunk layer. At 412, the thunk layer is loaded for the associated rendering context. At 414, one or more command buffers are allocated by the thunk layer when the thunk layer is loaded. At 416, an OS kernel mode driver is loaded when the thunk layer is loaded. At 418, a device specific kernel mode driver for a given graphics processing unit (GPU) is loaded when the OS kernel mode driver is loaded.

At 420, the guest shim layer requests from the D3D HGCM service module through the HGCM a copy of the binary of the host D3D DDI that is stored on the host device. At 422, the D3D HGCM service module returns the copy of the host D3D to the guest shim layer through the HGCM. At 424, the guest shim layer receives the host D3D DDI binary and stores the host D3D DDI binary on the disk of the virtual machine. The shim layer loads and uses the entry points of the imported host D3D DDI binary to generate command buffers to pass down to the host through the HGCM.

In one implementation, VirtualBox includes a software development kit (SDK) that provides a HGCM. The HGCM provides for registering that the D3D HGCM service module is callable by the shim layer within the guest. Conventionally, VirtualBox also has its own graphics drivers (e.g., user mode and kernel mode) for software based rendering on the central processing unit. However, software based rendering on the central processing unit provides substantially lower rendering performance compared to hardware based graphics rendering on a graphics processing unit. Accordingly, embodiments of the present technology make use of the HGCM of VirtualBox, but not the graphics drivers of VirtualBox.

At 426, the guest shim layer loads a guest display device interface (DDI) user mode driver when the guest shim layer is loaded and passes the pointers to the one or more command buffers to the guest DDI. At 428, the guest DDI returns to the guest shim layer callbacks to rendering functions with pointers to corresponding data structures when the guest DDI is loaded. The processes of 402-428 are repeated for each application running under control of an instance of a virtual machine guest OS.

At 430, the runtime API calls to the guest shim layer with the received graphics commands. At 432, the guest shim layer calls to the guest DDI with the received graphics commands. At 434, the guest DIN processes the received graphics commands including filling one or more command buffers with arguments from the rendering command. At 436, the guest DDI calls back to the guest shim layer with an appropriate function call, after the guest DDI processes a set of one or more corresponding rendering commands. The function calls may be rendering functions, present functions, and/or the like. If the function is a rendering function, the call includes pointers to one or more command buffers. At 438, the guest shim layer sends the function calls with a token ID (e.g., handle) from the guest DDI through the communication channel provided by the HGCM to the D3D HGCM service module. The function calls may be sent to the D3D HGCM service module utilizing the graphics buffer memory space that maps the virtual machine host operation system to the virtual machine guest operating system. The processes of 430-438 are performed for each application running under control of a different instance of a virtual machine guest OS.

In one implementation, the runtime API may receive approximately 100-300 graphics commands for each rendered frame. The guest DDI calls back with approximately 2-6 function calls for each rendered frame. The parameters of the graphics commands are loaded by the guest DDI directly into command buffers in the VMM host OS memory space that the OS kernel mode driver and/or device specific kernel mode driver can access directly, without additional memory accesses. Accordingly, the communication channel between the shim layer and D3D HGCM service module is limited to 2-6 function calls instead of 100-300 graphics commands.

At 440, the D3D HGCM service module determines a rendering context associated with the token ID for each function call received from a guest shim layer instance. At 442, the D3D HGCM service module sends each function call of a given rendering context to the corresponding instance of the thunk layer. At 444, the given thunk layer sends the function call to the OS kernel mode driver. At 446, the OS kernel mode driver sends the function call to the device specific kernel mode driver. At 448, the OS kernel mode driver schedules the function call by setting command register of the GPU to execute the function call. The processes of 440-448 are performed by the corresponding instances of the thunk layer, OS kernel mode driver and device specific mode driver for the associated rendering context.

At 450, the GPU outputs rendered frame data to the device specific kernel mode driver if the function call is a present function. At 452, the device specific kernel mode driver returns the rendered frame data through the OS kernel mode driver, and thunk layer to the D3D HGCM service module. At 454, the D3D HGCM service module passes the rendered frame data to an encoder for encoding to compress the rendered frame data. At 456, the encoder passes the encoded compressed frame data to a network interface for transmission to a user device.

Embodiments of the present technology advantageously enable several graphics applications to run at the same time on a server computing device with several graphics processing units. Embodiments advantageously enable increased density on graphics processing unit client-server platforms and cloud computing platforms. The host-to-guest communication is relatively low and fast in accordance with embodiments of the present technology, which is good for performance. In one implementation, calls from the guest OS to the host OS may occur in approximately 0.3 ms or less roundtrip. The guest physical addresses can overlap the physical addresses of the GPU running on the base OS, so that there is no duplication, which is also good for performance. The applications, in accordance with embodiments of the present technology, see genuine operating system files, which are robust for anti-cheat techniques and digital rights management techniques. The applications have the impression of running full screen which is also good for performance. The user mode drivers run in the virtual machine, which can be capped, pinned, throttled and/or the like to cores, threads, and/or the like. Encoding can feed off the render target in the host which is also good for performance. The virtual machine driver can report 1/n FB size, wherein n is the number of virtual machines. The rendering can be done on any GPU, including headless Tesla, when attached as a headless DX rendering device.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
loading a given instance of a guest shim layer;
loading a given instance of a guest display device interface that calls back into the given instance of the guest shim layer, in response to loading the given instance of the guest shim layer, wherein the guest shim layer and the guest display device interface are executing under control of a virtual machine guest operating system;
requesting, by the given instance of the shim layer to a host-guest communication manager (HGCM), a communication channel between the given instance of the guest shim layer and a three dimensional graphics application programming interface host-guest communication manager (D3D HGCM) service module, in response to loading the given instance of the guest shim layer;
loading the D3D HGCM service module and creating a communication channel between the given instance of the shim layer and the D3D HGCM service module, by the HGCM, in response to the request for the communication channel;
mapping shared memory between a virtual machine host operating system and the virtual machine guest operating system to create a graphics command buffer memory space for each of a plurality of rendering context, by the given instance of the shim layer; and
sending one or more function calls of a given rendering context, utilizing the graphics buffer memory space, from the given instance of the guest shim layer through the communication channel to the D3D HGCM service module.

2. The method according to claim 1, wherein the graphics buffer memory space includes pages sharing between the virtual machine host operating system and the virtual machine guest operating system.

3. The method according to claim 1, wherein the guest shim layer is not a display device interface user mode driver of a virtual machine manager including the HGCM.

4. The method according to claim 1, wherein the guest display device interface is not a display device interface user mode driver of a virtual machine manager including the HGCM.

5. The method according to claim 1, wherein the HGCM comprises a software development kit (SDK) of VirtualBox.

6. The method according to claim 1, further comprising:
loading the given instance of a guest shim layer in response to a given instance of a runtime application programming interface receiving a first graphics command from a given application;
loading the D3D HGCM service module and creating a communication channel between the given instance of the shim layer and the D3D HGCM service module, by the HGCM, in response to the request for the communication channel;
passing the graphics commands from the given instance of the runtime application programming interface through the given instance of the guest shim layer to the given instance of the guest display device interface;
calling back from the given instance of the guest display device interface into the given instance of the guest shim layer with one or more function calls based on a set of the graphics commands; and
sending the one or more function calls from the given instance of the guest shim layer through the communication channel to the D3D HGCM service module.

7. The method according to claim 1, wherein the HGCM registers that the D3D HGCM service module is callable by the given instance of the shim layer.

8. One or more non transitory computing device readable media storing one or more sets of computing device executable instructions which when executed by one or more processing units perform a process comprising:
loading a given instance of a guest shim layer;
loading a given instance of a guest display device interface that calls back into the given instance of the guest shim layer, in response to loading the given instance of the guest shim layer, wherein the guest shim layer and the guest display device interface are executing under control of a virtual machine guest operating system;
requesting, by the given instance of the shim layer to a host-guest communication manager (HGCM), a communication channel between the given instance of the guest shim layer and a three dimensional graphics application programming interface host-guest communication manager (D3D HGCM) service module, in response to loading the given instance of the guest shim layer;

loading the D3D HGCM service module and creating a communication channel between the given instance of the shim layer and the D3D HGCM service module, by the HGCM, in response to the request for the communication channel;

mapping shared memory between a virtual machine host operating system and the virtual machine guest operating system to create a graphics command buffer memory space for each of a plurality of rendering context, by the given instance of the shim layer; and sending one or more function calls of a given rendering context, utilizing the graphics buffer memory space, from the given instance of the guest shim layer through the communication channel to the D3D HGCM service module.

9. The non-transitory computing device readable media according to claim 8, further comprising:

loading the given instance of a guest shim layer in response to a given instance of a runtime application programming interface receiving a first graphics command from a given application;

loading the D3D HGCM service module and create a communication channel between the given instance of the shim layer and the D3D HGCM service module, by the HGCM, in response to the request for the communication channel;

passing the graphics commands from the given instance of the runtime application programming interface through the given instance of the guest shim layer to the given instance of the guest display device interface;

calling back from the given instance of the guest display device interface into the given instance of the guest shim layer with one or more function calls based on a set of the graphics commands; and sending the one or more function calls from the given instance of the guest shim layer through the communication channel to the D3D HGCM service module.

10. The non-transitory computing device readable media according to claim 8, wherein the given instance of the guest shim layer is loaded by an injected application initialization routine that changes a search path for the runtime application programming interface to point to the guest shim layer.

11. The non-transitory computing device readable media according to claim 8, wherein the guest shim layer is not a display device interface user mode driver of a virtual machine manager including the HGCM.

12. The non-transitory computing device readable media according to claim 8, wherein the guest display device interface is not a display device interface user mode driver of a virtual machine manager including the HGCM.

13. The non-transitory computing device readable media according to claim 8, wherein the HGCM comprises a software development kit (SDK) of VirtualBox.

14. The non-transitory computing device readable media according to claim 8, wherein the page sharing is implemented by the graphics buffer memory space between the virtual host operating system and the virtual guest operating system by a VirtualBox monitor.

\* \* \* \* \*